United States Patent [19]

Winterle

[11] Patent Number: 4,815,360

[45] Date of Patent: Mar. 28, 1989

[54] ROD-PISTON CONNECTION

[76] Inventor: Albert Winterle, 4602 W. 72nd St., Chicago, Ill. 60629

[21] Appl. No.: 73,395

[22] Filed: Jul. 13, 1987

Related U.S. Application Data

[63] Continuation-in-part of Ser. No. 881,562, Jul. 2, 1986, abandoned, which is a continuation of Ser. No. 781,307, Sep. 27, 1985, abandoned, which is a continuation-in-part of Ser. No. 426,669, Sep. 29, 1982, abandoned.

[51] Int. Cl.$^4$ .............................................. F16J 1/12
[52] U.S. Cl. .................................. 92/255; 29/156.5 A; 92/256; 403/369; 403/370; 403/374; 411/423
[58] Field of Search ................. 92/255, 256, 128, 259; 403/366, 367, 368, 369, 370, 374, 375, 365; 411/423, 301; 29/156.5 R, 156.15 A

[56] References Cited

U.S. PATENT DOCUMENTS

| | | | |
|---|---|---|---|
| 2,687,317 | 8/1954 | Capra | 403/375 |
| 2,699,589 | 1/1955 | Redell | 403/369 |
| 3,177,782 | 4/1965 | Sampson | 92/255 |
| 3,362,731 | 1/1968 | Gasche et al. | 403/370 |
| 3,426,657 | 2/1969 | Bimba | 92/255 |
| 3,807,285 | 4/1974 | Phillips | 92/255 |
| 4,040,327 | 8/1977 | Otaki | 411/423 |

FOREIGN PATENT DOCUMENTS

| | | | |
|---|---|---|---|
| 194042 | 1/1965 | Sweden | 411/423 |
| 825333 | 12/1959 | United Kingdom | 411/301 |

Primary Examiner—Edward K. Look
Attorney, Agent, or Firm—Balogh, Osann, Kramer, Dvorak, Genova & Traub

[57] ABSTRACT

A rod-piston connection uses a split ring, having two or more segments, provided with a plurality of shallow internal grooves which are adapted to mate with a corresponding plurality of shallow grooves on the piston rod, the outer periphery of the split ring having a tapered surface extending over the entire width of th split ring and adapted to mate with a corresponding wide tapered surface defined in a bore of a compression bushing which has a peripheral surface provided with threads which engage with an internal threaded surface in a cavity in the pistion. By applying a threading torque to the compression sleeve, a force is generated by the two tapered surfaces to force the compression sleeve into better contact with the pistion and to force the split ring into a better contact with the piston rod.

11 Claims, 2 Drawing Sheets

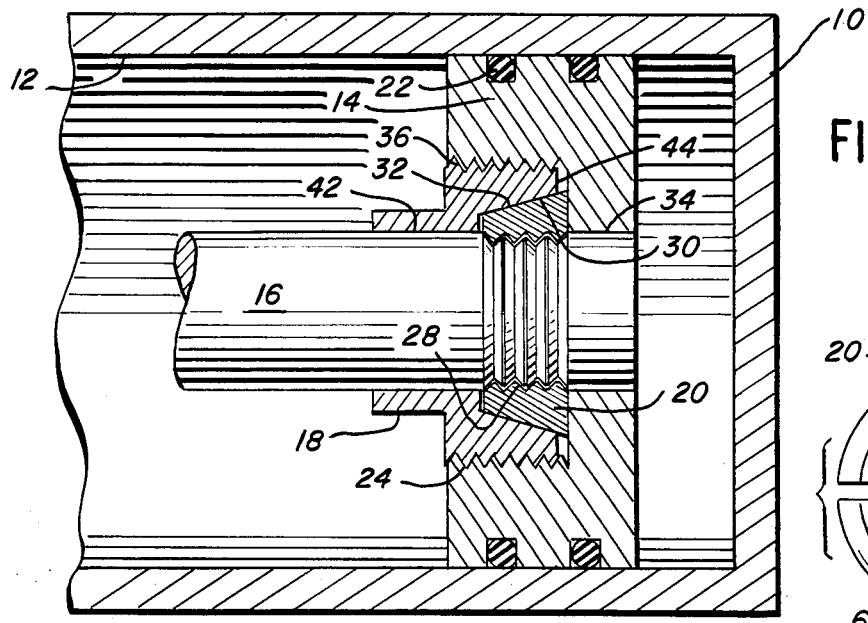
FIG. 1
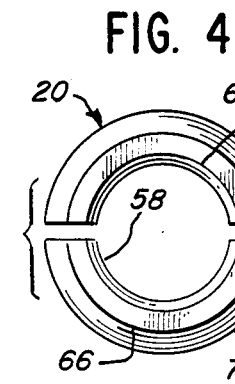
FIG. 4
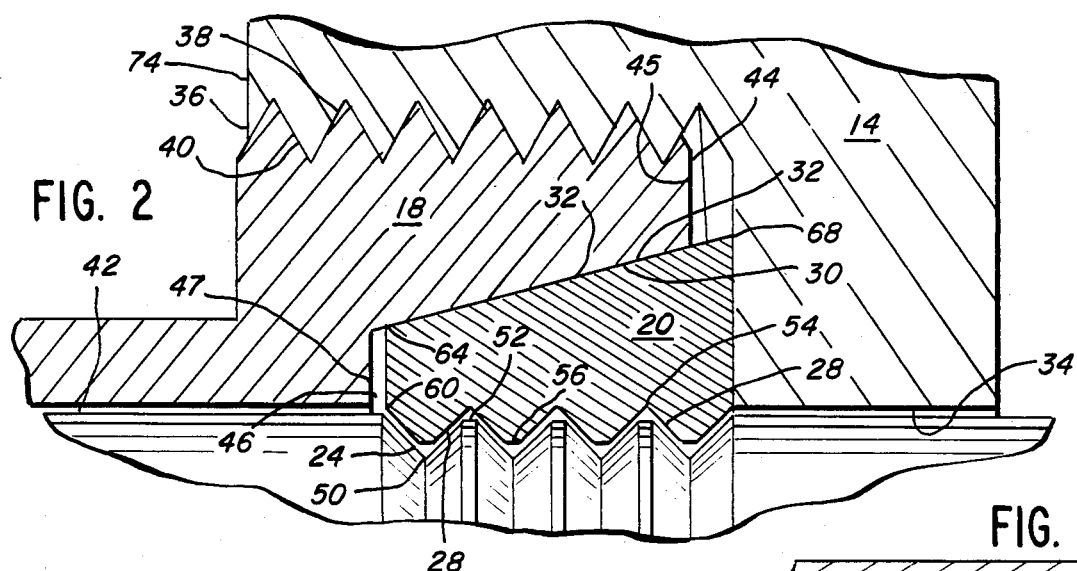
FIG. 2
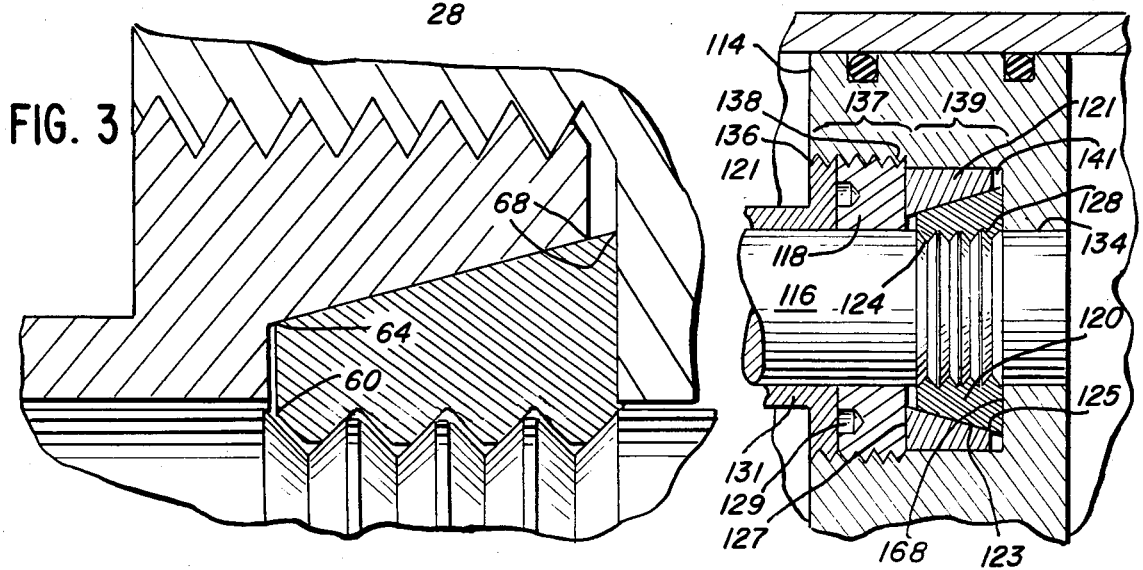
FIG. 3
FIG. 5

ROD-PISTON CONNECTION

This application is a continuation-in-part of application Ser. No. 881,562, filed July 2, 1986, now abandoned, which is a continuation of Ser. No. 781,307, filed Sept. 27, 1985, now abandoned, which is a continuation-in-part of Ser. No. 426,669 filed Sept. 29, 1982, now abandoned.

BACKGROUND OF THE INVENTION

Field of the Invention

This invention relates generally to means for interconnecting a piston to a rod, and more particularly relates to an attachment of a piston to a rod in a fluid power cylinder. This attachment is useful in fluid power cylinders, whether they are double-acting or single acting.

DESCRIPTION OF THE PRIOR ART

The piston and the interconnecting rod must be secured in such manner that there is no movement between the two, otherwise, during the application of a force to the piston, there will be metal-to-metal impact between the piston and the rod. There are several means of obtaining a satisfactory connection between the rod and the piston. For example, one way of obtaining this is by welding or brazing the rod to the piston. However, there is a great possibility that some warpage will occur with this type of connection. Another manner of connecting the rod to the piston is by machining a groove in the rod and machining a complementary groove in the piston so that a split ring may be inserted into the groove portions by means of a compression bushing, for example, as that shown and described in U.S. Pat. No. 3,807,285. A disadvantage of the foregoing split ring connection is that the groove machined in the rod results in reducing the diameter of the rod. This reduces the strength of the rod, and the full impact of the stresses is applied in a limited area, namely, the contact area supported by the groove. Another disadvantage of using this known type of a split ring arrangement is that the inner and outer circumferences of the split ring are surrounded by empty spaces, i.e., unsupported areas. Should a momentary overload occur, the split ring can be deformed and slightly moved into the area occupied by the empty spaces, thereby creating thereafter a play between the piston and the rod. Furthermore, the known split ring is subject to deformation in case of an overload for the reason that all of the stresses are applied to a small portion of the split ring.

The present invention accomplishes the connection of the piston and the rod using a split ring in such manner that the stresses applied thereto are distributed substantially over the entire surface area of the split ring.

SUMMARY OF THE INVENTION

A rod-piston connection uses a split ring having a plurality of shallow internal grooves which are adapted to mate with correspondingly shallow grooves in the rod, the outer periphery of the split ring having a tapered surface adapted to mate with a corresponding tapered surface in the bore of a compression sleeve which has a peripheral surface provided with threads which engage with an internal threaded surface in a cavity in the piston. The compression bushing via its tapered surface substantially engages all of the tapered surface extending across the entire width of the split ring. The grooves in the piston rod are preferably V-shaped and are truncated at the external apices. Similarly, the grooves in the split ring are correspondingly V-shaped with truncated external apices so that any compression force which is applied by the compression bushing will force the split ring into an intimate contact with the piston rod. A modified form of the invention uses a pair of tapered split rings which, when forced into intimate contact with each other, will generate equal and opposite forces directed against a bore in the piston and against the grooved surfaces on a piston rod.

The object of this invention is to connect a piston to a rod using simple and inexpensive methods, thus avoiding one or more of the disadvantages of the prior art.

Another object of the invention is to provide an interconnection between the piston and the rod using a combination of a compression bushing and a split ring.

A further object of the invention is to provide a rod having a multitude of shallow grooves adapted to be engaged by a corresponding multitude of shallow grooves formed in the bore of the split ring.

A still further object of the invention is to provide a compression bushing which has an internal tapered bore adapted to contact substantially the entire tapered surface on the outer periphery of the split ring.

Another object of the invention is to provide a connection between the rod and the piston with absolutely no voids therebetween by using a filling means.

Another object of the invention is a piston-rod connection provided by multiple grooves, the number of which are determined by the load the piston must carry.

A still further object of the invention is to provide a rod which is grooved for a distance dictated by the load.

A still further object of the invention is to provide tapered surfaces between the compression bushing and the split ring, the degree of taper being dictated by the load.

With the forgoing and other objects in view, the invention consists of a novel construction, combination and arrangement of various components, which will be more specifically described and illustrated in the accompanying drawings.

It should be understood that various changes, variations, and modifications may be effected in the invention, but still will fall within the scope of the claims following the description.

BRIEF DESCRIPTION OF THE DRAWINGS

FIG. 1 shows a longitudinal section through a fluid power cylinder showing the attachment of a rod to a piston;

FIG. 2 is an enlarged view of a portion of FIG. 1 showing the detail of the piston-rod connection;

FIG. 3 shows the piston-rod connection as it exists under a load;

FIG. 4 shows an end view of a split ring; and

FIG. 5 shows an alternate embodiment of a rod-piston connection; and

DESCRIPTION OF THE PREFERRED EMBODIMENT

Figure 6:
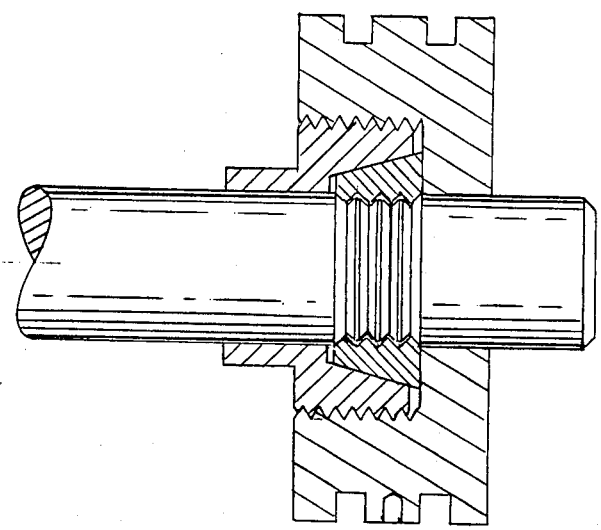
FIG. 6 shows another alternate embodiment of a rod-piston connection.

The preferred embodiment of the invention is illustrated in FIGS. 1-4.

Referring to FIG. 1, there is shown a fluid power cylinder 10 having a bore 12 containing a piston 14 secured to a piston rod 16 by compression means, such as a bushing 18 and wedging means such as a split ring 20. The piston 14 is provided with one or more packing rings 22 to prevent leakage between the piston and the cylinder. The piston rod 16 is provided with a plurality of independent grooves 24 having apices which may possess the form of apices of National Fine Thread. The number of grooves is determined by the load the piston must carry. The purpose for the multiple grooves is to be able to support large loads without reducing the diameter of the piston rod. The split ring 20 has been provided with a similar plurality of independent grooves 28, which are adapted to engage with grooves 24 on the rod.

The outer periphery of the split ring 20 is provided with a tapered surface 30 which is adapted to engage with a tapered bore surface 32 of the compression bushing 18. It is clear that ninety percent (90%) or more of the tapered surface 30 extending across the width of the split ring 20 is stressed by the compression bushing 18.

The piston 14 is provided with a small bore 34 which snugly engages the piston rod 16 and a large bore 36 which is provided with a threaded surface 38 which is adapted to threadedly engage a threaded surface 40 on one end of the compression bushing 18. The threaded bushing 18 has a bore 42 which is in snug engagement with the piston rod 16. A small clearance 44 exists between an outer end 45 of the bushing 18 and the piston 14 and another clearance 46 exists between an inner end 47 of the compression bushing 18 and one side of the split ring 20. As is apparent, the object of the various clearances is to permit the compression bushing to be tightened without encountering any obstructions.

The degree of the taper existing in the tapered surfaces 30 and 32 is dictated by the load to be applied to the piston.

Referring to FIG. 2, it will be seen that the grooves 24 define a plurality of internal apices 50 and a plurality of external truncated apices 52. The grooves 28 in the split ring 20 define a number of internal apices 54 and a number of external truncated apices 56. As is apparent, the truncated apices allow the split ring 20 to be forced more intimately into engagement with the rod 16 by the wedging forces developed by the tapered surfaces 30 and 32.

FIG. 4 is an end view of the split ring 20 as seen by looking from the left to the right in FIG. 1. The split ring has a circumference slightly less than 360°. The external truncated apices 56 are defined by the contour line 58, a corner 60 being defined as contour line 62. A corner 64 is defined by a contour line 66, and the major circumference 68 is defined by the contour line 70. It is possible to use a split ring having more than two segments.

In assembling the fluid power cylinder 10, the split ring 20 is placed around the piston rod 16 so that the grooves 24 on the rod mate with the grooved portion defined by the grooves 28 on the split ring 20. Thereafter, the aforesaid assembly of the rod and split ring is inserted into the piston 14. Then, the compression bushing 18 is slipped over the rod 16 and pushed toward the split ring until engagement is made between the outer end 45 of the compression bushing and a front face 74 of the piston, at which time, rotary motion is applied to the compression bushing so that it threadedly engages with the piston. As the outer end 45 of the compression bushing enters the interior of the piston, a sliding wedging force is applied to the split ring 20 forcing it into the grooves 24 on the rod 16. A very important point to be made here is that the taper and the torque applied to the compression bushing 18 will determine a predetermined amount of pre-stress on the thread-like grooves 28 and 30.

FIG. 2 shows the rod-piston connection when assembled and the compression bushing 18 is finger tightened, the spatial separation between the grooves 24 and 28 being slightly exaggerated. When more rotary force is applied to the compression bushing 18 by a tool, such as a spanner wrench, the grooves 24 and 28 will move into a more intimate contact as shown in FIG. 3.

Since it is not necessary to machine close tolerances between the various components comprising the rod-piston connection, it may be desirable to fill any voids that exist in the connection by applying a film of adhesive which will solidify in the absence of air. A connection so obtained is a solid connection, devoid of any air spaces. The grooves 24 on the piston rod 16 are formed at the same time that the finishing touches ar applied by the screw machine. Other types of shallow groove configurations may be used beside the type disclosed herein.

Although it is preferable to use a segmented split ring 20, as shown in FIG. 4, it is possible to use a split ring having a "C"-shape.

Another embodiment of the invention is illustrated in FIG. 5, which shows most of the structural components described and illustrated in the previous FIGS. 1–4. The structural components in FIG. 5, which are similar to those shown in FIGS. 1–4, will bear a similar reference, except that it will be increased by 100.

A piston 114 has a large bore 136 having an outer section 137 provided with a threaded surface 138 and an inner section 139 having a smooth cylindrical surface 141. The piston 114 also has a small bore 134 for receiving a piston rod 116 which has a plurality of grooves 124 adapted to interengage with a corresponding plurality of grooves 128 on a wedging member in the form of a split ring 120. The split ring 120 accurately locates the piston 114 to the piston rod 116 by abutting a major diameter 168 against a bottom of the large bore 136.

A further wedging member in the form of a split ring 121 has an internal taper 123 adapted to slidably engage an external taper 125 on the split ring 120. A compression means in the form of a compression bushing 118 threadedly engages the threaded surface 138 in the large bore 136 and is adapted to abut a large end 127 of the split ring 121. The compression bushing 118 has a series of apertures 129 which function to receive lugs on a spanner wrench (not shown) which is used to apply torque to the compression bushing to force the split ring 121 over the split ring 120. In other words, when the compression bushing 118 is screwed into the threaded surface 138 in the piston 114, the split ring 121 bears on the split ring 120 forcing it into the tapered annula formed by the split ring 120 and the cylindrical surface 141 on the inside of the piston 114. As a result, the split ring 120 is forced down into the grooves 124 in the piston rod 116. At the same time, the split ring 121 is forced to expand in the bore 136 of the piston 114. As a result, there is zero clearance axially and zero clearance circumferentially. This bi-directional stress on the thread-like grooves 124 and 128, as generated by the torque applied to the compression bushing 118, provides a joint having all the strength of a pre-stressed threaded joint.

The split rings 120 and 121 may have a single split to define a C-shaped element. Another form that one or both of the foregoing split rings may assume is a ring having two splits, for example, as shown in FIG. 4. As a further alternative, the aforesaid split rings may possess more than two segments.

A threaded cushion collar 131 completes the closure of the large bore 136 by abutting the outer end of the compression bushing 118.

Although the invention was particularly described for use in connecting a rod to a piston, it is obvious to use the structural elements that have been described for securing a rod to a base or a cavity means comprising a large bore concentric with a small bore, the small bore being adapted to receive the rod and the large bore being adapted to receive the split rings.

Industry standards are applicable to hydraulic and pneumatic cylinders. Under the standards, the piston rod outer end must be threaded to accommodate a male threaded stud of prescribed diameter. The size of the connecting stud will serve to establish a minimum diameter of the piston-rod, while the maximum diameter will be established by consideration of weight and cost. Most prior art structures have a portion of the length of the rod reduced in diameter to provide a shoulder. The piston is disposed over the reduced diameter portion of the rod, and the piston abuts against the shoulder. The piston is held in place by a threaded nut fastener engaging the inner end of the rod. Tightening of the threaded nut fastener forces the piston against the shoulder portion of the rod formed by the difference of diameters of the rod. This arrangement usually results in a structure where the rod at part of it s length has a diameter less than the diameter of the standard connecting stud that attaches to the outer end of the rod. In case of severe overload or jamming or some excessive strain situation, breakage will always occur. In the prior art structures described, this breakage will occur at the reduced diameter portion of the rod, at it s inner end, within the cylinder, where the rod engages the piston. Such breakage necessitates replacement and rebuilding of the cylinder-piston assembly. In the present invention, there is no need to reduce the diameter of the rod to provide a shoulder. The rod diameter is only reduced to the extent of the depth of the circumferential grooves. Hence, breakage in like circumstances will occur in the present invention outside of the cylinder, at the standard attachment stud, all of which is much less costly and is less complex with respect to repair. Where the structure is to be designed to carry a heavier load, in the prior art, it is necessary to provide a larger shoulder, which will result in either having a further reduced diameter of the rod, or resorting to a larger and subsequently heavier diameter rod. In the present invention, designing to accommodate heavier loads, it is not necessary to make deeper circumferential grooves and subsequent narrowing of the diameter of the rod, but is only necessary to use a longer series of grooves in the length of the rod in order to obtain greater load transmitting capacity. That is to say that in the present invention, the load capacity of the structure can be increased without reducing rod diameter, and subsequently weakening the structure. It is understood that increasing of the number of circumferential grooves in the rod requires a corresponding increase in the number of circumferential grooves in the mating split rings.

The concept of the present invention enables solid transmission of load or force from the piston to the rod in two directions, with no space between mating grooves to create a possibility of the connection working itself loose over a period of prolonged operation. The forcing together of the split rings and the rod to form a force transmitting connection is perpendicular to the axis of the rod, and hence the action is on both sides of the respective grooves, unlike a thread connection with a force is transmitted through one side of the threaded groove.

The tapered arrangement provides the force or stress to both sides of the groove, and both the split ring 18 and the rod 16. The locking ring transmits the force in the rod either to the tapered jam ring 20 or the piston bottom, depending upon the direction of travel. Reaction frame is then completed by stressing the back sides of the threads on the tapered jam ring, and opposite sides of the threads on the piston. Since both flanks of the thread like grooves are stressed, the reaction frame is completed without the need for shouldering the rod against any portion of the piston.

The amount of load that the rod can carry is determined by the root diameter of the grooves in the rod, and the number of grooves. An increase in the area of the grooves is accomplished by not increasing the depth of the grooves, but rather by increasing the number of the grooves. This is not possible if the rod has one of two simple split washers or a simple split tapered washer. It is also not possible if the rod is threaded, because of the inability of a thread to transmit load in two directions.

The present invention has a further advantage of being less expensive to produce than prior art structures, since the rod can be machined in a single machine setting, rather than in two settings of the machining apparatus, that is whereby machining is done at one end of the rod first, and then the rod is reversed, and the machining is done at the opposite end of the rod. This is not necessary in the present invention.

A very high degree of commercial success has been experienced in connection with the concept of this invention.

This invention, as described, should not be restricted to the precise details of construction shown, since various changes and modifications may be made therein without departing from the scope of the invention or sacrificing the advantages to be derived from its use.

A further embodiment of the invention is shown in FIG. 6, showing a piston rod 170 supporting a piston 172 via a cushion member 171 and a tapered split ring 176. The piston rod 170 has a rod extension 178. However, the end of the piston rod 170 may terminate at the phantom line 180. The cushion member 174 is provided with a collar 182. The piston 172 has a bore 184 provided with internal threads 186 which are adapted to engage with external threads 188 on the outer periphery of a portion of the cushion member 174. The cushion member 174 has a bore 190 defined by a tapered surface 192 which is adapted to slidably cooperate with a tapered surface 194 on the exterior of the split ring 176.

The piston rod 170 is provided with threads 196 which are adapted to interengage with threads 198 located on the interior of the tapered split ring 176. A clearance 200 is provided between the cushion member 174 and the split ring 176. Similarly, a clearance 202 is provided between the cushion member 174 and an inner wall 204 of the piston 172.

As shown in FIG. 6, the piston rod 170 has a rod extension 178 which extends beyond an end surface 206 of the piston 172 or may terminate at a phantom line 180. Alternatively, the rod extension may end below the end surface 206, for example, as shown by phantom line 208. The point to be made here is that the piston is provided with an opening 210 providing access to the end of the piston rod at all times.

In assembling the rod-piston connection, the cushion member 174 is mounted on a collet which firmly secures onto the collar 182. Thereafter, the exterior surface of the piston rod 170 is engaged by a spanner wrench (not shown) which engages spanner apertures 212. The spanner wrench applies a high torque (the amount depending on the diameter of the piston rod 170) while hammering the rod extension and simultaneously applying a transmitted hammering force to the tapered split ring 176. Sufficient force is applied to expand the cushion member outwardly into the threads 186 of the piston rod. The small section 214 represented by the cushion member taper no longer provides the hoop strength necessary to carry the load since the external threads 188 of the cushion member are in intimate contact with the internal threads 186 on the piston 172.

As shown in FIG. 6, the hammering force would be applied to the end 216 directly with a hammer or other tool. In the event that the end of the rod extension terminated flush with the surface 206 of the piston, as shown by phantom line 180, or below the surface of the piston, as shown by phantom line 208, an appropriate tool would be used so as not to apply any hammering force to the piston 172. The opening 10 provided by a bore 218 centrally extending through the portion 220 of the piston 172 provides access to the rod extension 178.

This invention, as described, should not be restricted to the precise details of construction shown, since various changes and modifications may be made therein without departing from the scope of the invention or sacrificing the advantages to be derived from its use.

What is claimed is:

1. A rod piston connection for use in a fluid power cylinder, comprising a plurality of parallel spaced separate outer annular grooves disposed intermediate the ends of the rod, and being defined by adjoining V-shaped roots and truncated crowns, a split ring having first tapered outer surface and an interior surface provided with separate inner annular grooves defined by adjoining V-shaped roots and truncated crowns, a piston having a first inner concentric bore for receiving said rod and having a second enlarged inner concentric bore with a threaded inner surface, a compression bushing axially receivable in said enlarged portion of said piston and having a second tapered inner surface adapted to engage with said first tapered outer surface of said split ring, and a threaded outer surface for engagement with said inner threaded surface of said piston, and thread means on said compression bushing and on said piston for mutual engagement for urging said compression bushing axially along the rod into said enlarged portion of said piston, said thread means defining a clearance between an outer end of said compression bushing and the piston and a further clearance between the inner end of said compression bushing and one side of said split ring, whereby the slidable engagement between the two tapered surfaces forces the truncated crown of said split ring into the V-shaped roots of the piston rod and simultaneously forces the truncated crowns on said rod into the V-shaped roots of said split ring to effect a solid contact connection, whereby both sides of all of said V-shaped roots are equally contacted and loaded by both sides of all of said crowns, wherein all of said plurality of grooves define a series of externally extending truncated apices in a series of internally disposed V-shaped apices, said truncated apices and said V-shaped apices defining therebetween a series of spaced clearances to permit additional groove mating, whereby application of a force to said two tapered surfaces will permit total entry of the truncated apices toward the V-shaped apices to thereby define total surface engagement between said split ring and said rod.

2. A rod-shaped piston connection as claimed in claim 1, wherein the engagement between the two tapered surfaces is substantially ninety percent (90%) of the width of the ring means.

3. A rod-piston connection for use in a power apparatus such as a fluid power cylinder, comprising a piston rod having a plurality of parallel spaced circumferential grooves, each groove being independent of the other groove, a plurality of parallel spaced truncated circumferential lands interspersed between said grooves, ring means having a bore surface provided with a corresponding plurality of parallel spaced grooves adapted to mate with the lands on said piston rod, each groove being independent of the other grooves, a plurality of parallel spaced truncated lands interspersed between said grooves on said ring means, a piston having a minor bore for snugly receiving said piston rod and having a threaded partial major bore for receiving said ring means, compression means having a bore for slidably receiving said piston rod and having a circumferential threaded periphery for threaded engagement with said threaded major bore in said piston, the side of the ring means opposite to said bore surface provided with the grooves defining a concentric tapered surface over the entire length of said ring means, the side of said compression means opposite to said circumferential threaded periphery defining a concentric tapered surface to substantially engage the entire tapered surface on said ring means, whereby application of a threaded torque to said compression means forces said ring means against an end wall of said piston and simultaneously forces transversely said lands into respective grooves to equally load both sides of the respective grooves.

4. A rod-piston connection as claimed in claim 3, wherein said plurality of grooves on said piston rod are defined as a piston groove set, and said plurality of grooves in said ring means are defined as a ring means groove set, one of said grooves sets having a series of truncated apices and the other groove set, having a series of V-shaped apices, said truncated lands define truncated apices and said grooves define V-shaped apices defining therebetween, a series of spaced clearances to permit unobstructed groove and land mating, whereby application of a force to said two tapered surfaces will permit total entry of the truncated apices toward the V-shaped apices to thereby define a total surface engagement between said ring means and said rod.

5. A rod-piston connection as claimed in claim 3, wherein the engagement between the two surfaces is substantially ninety percent (90%) of the width of the ring means.

6. A rod-piston connection for use in a fluid power cylinder, comprising a threaded surface disposed intermediate the ends of the rod, said rod having a rod extension, a split ring having a first tapered outer surface and an interior surface provided with threads, a piston having a first inner concentric bore for receiving said rod and having a second enlarged inner concentric bore with a threaded inner surface, said inner concentric bore having an opening which provides access to the rod extension, a cushion member having a collar axially receivable in said enlarged portion of said piston and having a second tapered inner surface adapted to engage with said first tapered outer surface of said split ring, and a threaded outer surface for engagement with said inner threaded surface of said piston, and thread means on said cushion members and on said piston for mutual engagement for urging said piston axially along the rod over said cushion member, said thread means defining a clearance between the outer end of said cushion member and the piston and a further clearance between the inner end of said cushion member and one side of said split ring, whereby the slidable engagement between the two tapered surfaces forces the truncated crowns of said split ring into the V-shaped roots of the piston rod and simultaneously forces the truncated crowns on said rod into the v-shaped roots of said split ring to effect a solid contact connection, whereby both sides of all of said V-shaped roots are equally contacted and loaded by both sides of all of said crowns.

7. A rod-piston connection according to claim 6, wherein said opening in said bore enables said rod extension to extend beyond an end surface of said piston.

8. A rod-piston connection according to claim 6, wherein said opening in said bore enables said rod extension to terminate flush with an end surface of said piston.

9. A rod-piston connection according to claim 6, wherein said opening in said bore enables said rod extension to terminate short of an end surface.

10. A method of effecting a rod-piston connection for use in a fluid power cylinder, wherein a piston rod has a threaded portion engaged by a threaded portion on a split ring having a tapered portion engaging a tapered portion on a cushion member provided with a collar, said cushion member having a threaded surface engaging an inner threaded surface on a piston having a central opening on its working side, comprising the steps of:
  (1) securing said collar against rotation,
  (2) applying torque to the exterior of said piston,
  (3) simultaneously applying a hammering action to one end of said rod to force tapered portions against each other, and
  (4) continuing the application of torque and hammering until there is no further movement of said piston with respect to said cushion member.

11. A method according to claim 10, including providing clearances between said piston and said cushion member and between the cushion member and the split ring to permit uninhibited movement along the tapered surfaces.

* * * * *